(12) United States Patent
Nickell (10) Patent No.: US 6,451,407 B1
(45) Date of Patent: Sep. 17, 2002

(54) ANTI-STATIC FILMS AND ANTI-STATIC FABRICS FOR USE IN MANUFACTURING BULK LINERS AND BULK BAGS

(75) Inventor: Craig Alan Nickell, Sherman, TX (US)

(73) Assignee: Super Sack Mfg. Corp., Dallas, TX (US)

(*) Notice: Subject to any disclaimer, the term of this patent is extended or adjusted under 35 U.S.C. 154(b) by 0 days.

(21) Appl. No.: 09/566,690

(22) Filed: May 8, 2000

Related U.S. Application Data (60) Division of application No. 09/479,396, filed on Jan. 6, 2000, now Pat. No. 6,207,592, which is a continuation-in-part of application No. 08/858,653, filed on May 19, 1997, now abandoned.

(51) Int. Cl.[7] ............................. B32B 3/10; B32B 5/26

(52) U.S. Cl. ................. 428/137; 428/317.5; 442/268; 442/277; 442/281; 442/290

(58) Field of Search .................. 442/268, 277, 442/281, 290; 428/137, 317.5

(56) References Cited

U.S. PATENT DOCUMENTS 4,431,316 A * 2/1984 Massey ...................... 383/113

* cited by examiner

Primary Examiner—Elizabeth M. Cole
Assistant Examiner—Jeremy R. Pierce
(74) Attorney, Agent, or Firm—Michael A. O'Neil (57) ABSTRACT

An anti-static film comprises one or more polymeric film layers having a layer of conductive, low capacitance material secured thereto. The polymeric film layer(s) may have pin holes formed therethrough. The conductive, low capacitance layer comprises one or more strands of conductive, low capacitance fiber arranged in a predetermined pattern. The polymeric film layer(s) are bonded one to the conductive, low capacitance material using a polymeric layer formed from the same material as the film layers. Alternatively, the layer of conductive, low capacitance material may be omitted, with the adhesive layer being extruded onto the polymeric layer having pin holes formed therethrough. Similarly, an anti-static fabric comprises one or more layers of woven polymeric material having a layer of conductive, low capacitance material secured thereto. Alternatively, the fabric may have or polymeric layer extruded thereon in which pinholes are formed.

2 Claims, 7 Drawing Sheets

ANTI-STATIC FILMS AND ANTI-STATIC FABRICS FOR USE IN MANUFACTURING BULK LINERS AND BULK BAGS

CROSS-REFERENCE TO RELATED APPLICATIONS

This application is a divisional of prior application Ser. No. 09/479,396 filed Jan. 6, 2000, now U.S. Pat. No. 6,207,592; which is a continuation-in-part of prior application Ser. No. 08/858,653 filed May 19, 1997, now abandoned.

TECHNICAL FIELD

The present invention relates to the manufacture of flexible intermediate bulk containers (hereinafter bulk bags) for handling flowable materials, and in particular to the manufacture of anti-static films for use in bulk bag liners and to the manufacture of anti-static fabrics for use in bulk bags.

BACKGROUND OF THE INVENTION

Over the past three decades there has been increasing interest in the use of flexible intermediate bulk containers (hereinafter bulk bags) for handling flowable materials such as chemicals, minerals, fertilizers, foodstuffs, grains and other agricultural products, etc. The advantages resulting from the use of bulk bags include low weight, reduced cost, versatility and, in the case of reusable receptacles, low return freight costs.

Fabrics are often utilized in the construction of various types of bulk containers where strength, flexibility and durability are important. Originally, such containers were fabricated from natural fibers. More recently, however, synthetic fibers manufactured from polypropylene, polyethylene or other polymeric materials have come into almost exclusive use. The popularity of synthetic fibers can be attributed to the fact that they are generally stronger and more durable than their natural fiber counterparts.

Even with the advances in fabric construction resulting from the shift from natural to synthetic fibers, fabrics in general possess qualities that render their use undesirable in certain applications. For example, the friction that occurs as dry flowable materials are handled by fabric receptacles tends to cause a significant build-up and retention of static electric charge within the receptacle. Discharge of the generated static electric build-up is often difficult, if not impossible, to control because fabrics are generally not electrically conductive materials. However, controlled discharge is imperative as static electric potential poses a significant danger of fire or explosion resulting from a static generated electrical spark.

In an effort to address the undesirable static electric discharge characteristic of fabrics, bag manufacturers covered one side of the fabric with a metallic foil-like layer. An adhesive was applied to affix the foil-like layer to the plastic fabric. The foil-like layer was typically comprised of aluminum or some other electrically conductive metal. The foil-covered fabric was then used to construct the receptacle, for example, with the foil side of the fabric comprising the interior surface. The foil layer provided an electrically conductive surface exposed to the flowable materials through which static electricity generated during material handling and was discharged to an appropriate ground.

While adequately discharging static electric build-up if undamaged, the foil-like layer was susceptible to abrasion, tearing and separation from the fabric layer through normal use of the receptacle. For example, in filling, transporting and/or emptying of foil-covered fabric receptacles, abrasion between the flowable material and the foil-like layer tended to cause the foil-like layer to tear and/or separate from the fabric layer. The cumulative effect of such abrasion quickly reduced the effectiveness of the foil-like layer as a static electric discharge surface. Furthermore, tearing of the foil often resulted in a release of foil particles and flakes from the fabric, thereby contaminating the contained flowable materials.

To address the problems experienced with foil-covered fabrics, U.S. Pat. No. 4,833,008, issued to Norwin C. Derby, discloses a metalized fabric comprised of a woven plastic base fabric laminated to a metalized plastic film. The plastic base fabric is preferably a woven polypropylene fabric, and the plastic film is preferably an extruded polypropylene film. The plastic film is metalized through a vapor deposition process whereby a thin film of electrically conductive material is deposited on one side of the plastic film. The woven plastic fabric and the metalized plastic film are then laminated together through use of a plastic adhesive. Unlike foil covered fabrics, the thin conductive layer deposited on the plastic film is not subject to tearing or flaking; however, it is susceptible to chemical reactions.

U.S. Pat. No. 5,244,281, issued to Norwin C. Derby discloses bags made from the fabric disclosed in the Derby '008 Patent in combination with fabrics impregnated with anti-static compounds. The bags disclosed in the Derby '281 Patent provide satisfactory anti-static capabilities. Still further developments in the art are disclosed in co-pending Application Ser. No. 8/474,378 filed by Norwin C. Derby and Craig A. Nickell on Jun. 7, 1995 and assigned to the assignee of the present application.

A more recent development in the art of static dissipating bulk bags is the "D" type bag which dissipates static electricity without the necessity of grounding by means of corona discharge. At present, "D" type bags are manufactured using CROHMIQ® fabric available from Linq Industrial Fabrics, which is in turn manufactured by weaving into the fabric NEGA-STAT® fibers manufactured by DuPont. The NEGA-STAT® fibers, while conductive, do not have sufficient capacitance to produce an energetic spark discharge. Rather, because of small size and geometry, the NEGA-STAT® fibers facilitate corona discharge. The CROHMIQ® fabric may also have an extrusion coating of a polymeric material having an anti-static loading of either glycol monosterate or Techmer PM 1530-E4.

"D" type bulk bags perform satisfactorily if no liner is required. Heretofore, no liner is available for use in "D" type bags. This is limiting because many powders have particle sizes that are too small to be effectively contained by bulk bags not having liners. Also, some regulated materials require a liner for shipment. Thus, a need exists for a bulk bag liner for use with a "D" type bag, and for a bulk bag liner that functions similarly to a "D" type bag.

Another recent development in the art of static dissipating bulk bags is the "B" type bag which is characterized by a breakdown voltage of less than 4,000 volts, thereby eliminating the possibility of propagating brush discharge. A "B" type bag is also non-conductive which eliminates the possibility of a spark discharge. Thus, in the use of a "B" type bag the only possible discharges of static electricity are brush discharges and corona discharges. "B" type bags are therefore adapted for use in almost all environments not involving flammable gases or solvents, and may be used for many sensitive dusts.

"B" type bags are less costly to manufacture than "D" type bags and are therefore preferable in suitable applications. Like "D" type bags, "B" type bags perform well when no liner is required. At present, no liner is available for use with "B" type bags. Since many bulk bag applications require a liner, a need exists for a liner suitable for use with "B" type bags or having the static electricity dissipating characteristics of a "B" type bag.

SUMMARY OF THE INVENTION

In accordance with a first embodiment of the present invention, an anti-static film suitable for use in manufacturing anti-static liners for bulk bags is fabricated by sandwiching a layer of conductive, low capacitance fibers between two layers of polymeric film. Preferably, the polymeric film layers comprise either polyethylene or polypropylene and may contain either about 6% glycol monosterate or about 10% Techmer PM 1530-E4, whereby the film layers are rendered anti-static. The film layers are preferably provided with small diameter pinholes extending therethrough. The polymeric film-conductive, low capacitance layer assembly is preferably constructed by extrusion coating the inside surface of one of the polymeric film layers with an adhesive comprising the same polymeric material as the film layers, positioning the conductive, low capacitance fibers onto the extruded adhesive, and then compressing the polymeric film layers into engagement with one another, whereby the polymeric film layers are secured one to the other and the conductive, low capacitance layer is secured therebetween by the adhesive.

The foregoing anti-static film may be advantageously employed in the construction of liners for bulk bags. The anti-static film may be cut into a plurality of pieces following a predetermined pattern, and the pieces are then assembled into a bulk bag liner having a desired shape by heat sealing the edges of the pieces one to the other using conventional heat-sealing techniques. In a typical application of the invention, the anti-static bulk bag liner would comprise four side walls, a bottom wall, and a top wall, all heat sealed one to the other along their respective edges. Alternatively, the anti-static film may be fabricated in a double-wide configuration, in which case the resulting bulk bag liner will have side walls comprising two opposed folded corners and two opposed seamed corners. Another alternative is to form the film into a tube having a uniform diameter along its length and gathered at the inlet and outlet of a bulk bag.

In accordance with a first alternative of the first embodiment of the invention, there is provided a length of polymeric film having pin holes formed therein in accordance with a predetermined pattern. A layer of conductive, low capacitance fibers is positioned on the polymeric film. Thereafter, an extruded layer is deposited on top of the layer of conductive, low capacitance fibers. The extruded layer is preferably formed from the same polymeric material that is used in forming the film. It serves to secure the layer of conductive, low capacitance fibers in place on the film, and also serves to fill the pin holes in the film.

In accordance with a second alternative of the first embodiment of the invention, there is provided a length of polymeric film having pin holes formed therein in accordance with a predetermined pattern. A layer of polymeric material is extruded onto one side of the film, and functions to fill the pin holes therein. The extruded layer preferably comprises the same polymeric material that is used in forming the polymeric film. A layer of conductive, low capacitance fibers is not utilized in the practice of the second alternative of the first embodiment of the invention.

The invention further includes a second embodiment comprising an anti-static fabric useful in the construction of bulk bags. The anti-static fabric comprises a layer of conductive, low capacitance fibers secured to a fabric layer. The fabric layer preferably comprises woven polypropylene which may be coated on the exterior surfaces with glycol monosterate or Techmer PM 1530-E4. The fabric layer/conductive, low capacitance layer sandwich is preferably constructed by positioning a layer of conductive, low capacitance fibers on the interior surface of the fabric, and then extrusion coating the interior surface of one of the fabric layers with a layer of adhesive, which preferably comprises the same polymeric materials as is used in the construction of the fabric layers.

The resulting anti-static fabric is used in the construction of bulk bags by cutting the anti-static material into pieces in accordance with a pre-determined pattern. The pieces are then joined together to form a bulk bag having a desired configuration by conventional techniques, typically sewing. The anti-static fabric of the present invention is adapted for use in the construction of bulk bags in accordance with any of the techniques commonly employed in the industry in bulk bag construction.

In accordance with a first alternative of the second embodiment of the invention, there is provided a length of polymeric fabric. A layer of conductive, low capacitance fibers is positioned on the polymeric fabric. Thereafter, an extruded layer is deposited on top of the layer of conductive, low capacitance fibers. The extruded layer is preferably formed from the same polymeric material that is used in forming the fabric. It serves to secure the layer of conductive, low capacitance fibers in place on the fabric.

In accordance with a second alternative of the second embodiment of the invention, there is provided a length of polymeric fabric. A layer of polymeric material is extruded onto one side of the fabric, after which pinholes are formed in the extruded layer. The extruded layer preferably comprises the same polymeric material that is used in forming the polymeric fabric. A layer of conductive, low capacitance fibers is not utilized in the practice of the second alternative of the second embodiment of the invention.

BRIEF DESCRIPTION OF THE DRAWINGS

A more complete understanding of the present invention may be had by reference to the following Detailed Description when taken in connection with the accompanying Drawings wherein.

DETAILED DESCRIPTION

Figures 1, 2, 3:
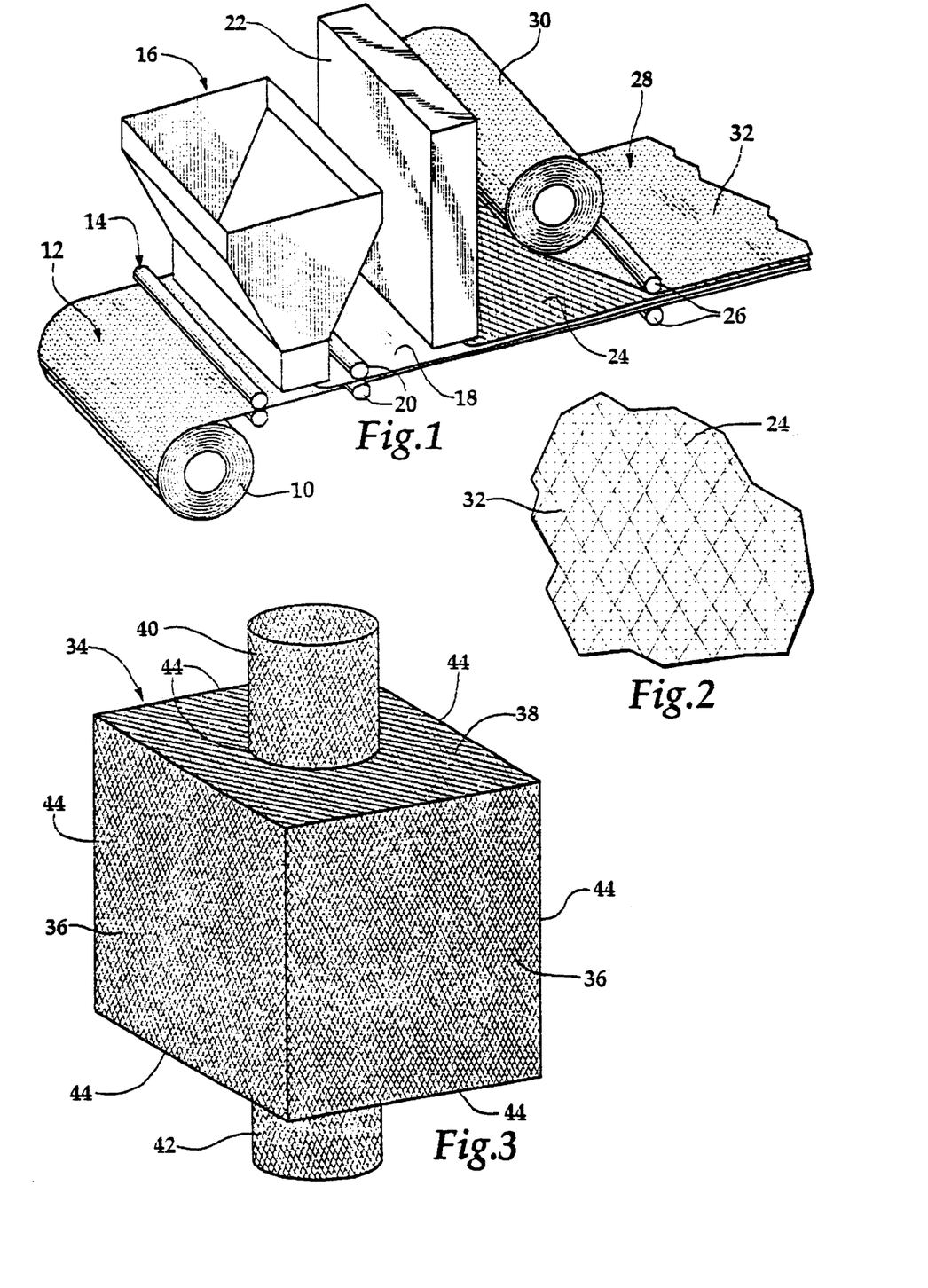
FIG. 1 is a diagrammatic illustration of a method of and apparatus for manufacturing anti-static films comprising a first embodiment of the invention.
FIG. 2 is an illustration of a section of antistatic film manufactured in accordance with the method and apparatus of FIG. 1.
FIG. 3 is a perspective view of an anti-static bulk bag liner comprising anti-static film manufactured in accordance with the present invention.

Referring now to the Drawings, and particularly to FIG. 1 thereof, there is illustrated a method of and apparatus for fabricating anti-static film comprising a first embodiment of the invention. A supply roll 10 supplies a length of polymeric film 12 which is directed along a predetermined path. A pair of pinch rollers 14 are employed to pull the length of polymeric film 12 from the supply roll 10. A variety of polymeric films may be utilized in the practice of the invention, however, the use of polyethylene film having a thickness of between about 1 mil and about 6 mils is preferred. The film 12 may be loaded with glycol monosterate or Techmere PM 1530-E4 and if so comprises an anti-static layer.

The length of polymeric film 12 is preferably perforated over its entire surface area. The perforations comprise very small diameter pinholes which extend entirely through the film 12. The pinholes may be formed by perforating pins having diameters of about 0.080 inches with the resulting pinholes having diameters of between about 50 and about 150 micrometers. The pinholes formed in the film 12 are preferably separated one from another by a distance of between about 0.2 centimeters and about 3 centimeters and more preferably by a distance of between about 1.5 centimeters and about 2 centimeters.

After passing through the pinch rollers 14, the length of polymeric film 12 passes through an extrusion coating mechanism 16. The extrusion mechanism 16 forms a layer 18 on the surface of the length of polymeric film 12. Various substances may be used in the practice of the invention to form the layer 18. However, the layer 18 preferably comprises a polymeric adhesive formed from the same polymer as is used in forming the polymeric film 12. Those skilled in the art will understand that although the film 12 and the layer 18 comprise the same base polymer, the two materials may differ slightly in that they may contain somewhat different additives. Like the film 12, the layer 18 may be loaded with glycol monosterate or Techmere PM 1530-E4, whereby the adhesive 18 comprises an anti-static material.

A pair of pinch rollers 20 may be utilized to regulate the thickness of the layer 18. Preferably, the thickness of the layer 18 is about 0.5 mil.

After passing through the pinch rollers 20, the polymeric film 12 and the layer 18 pass through a mechanism 22 which forms a layer of conductive, low capacitance fibers 24 on top of adhesive layer 18. The mechanism 22 is preferably of the type known in the art as Max Katz Bag Co. Diamond Pattern Scrim Laying Equipment. Such mechanisms receive fibers in roll form and function to apply the fibers from the roll onto a surface in accordance with a predetermined pattern. The spacing between the fibers is preferably between about 1 centimeter and about 3 centimeters and more preferably about 2 centimeters.

The conductive, low capacitance fibers comprising the layer 24 preferably comprise "RESITAT"® fibers available from B.A.S.F. Alternatively, the conductive, low capacitance fibers comprising the layer 24 may comprise "NEGA-STAT"® fibers available from DuPont. Other conductive, low capacitance fibers, now known or hereafter developed, may be utilized in the practice of the invention, if desired.

After passing through the mechanism 22, the length of polymeric material 12, the layer 18 formed thereon, and the layer of conductive, low capacitance fibers 24 pass through a pair of pinch rollers 26. A length of polymeric film 28, fed from a supply roll 30, also passes between the pinch rollers 26. The length of polymeric material 28 may be formed from any desired polymer, however, the length of polymeric material 28 preferably comprises the same polymeric material used in the manufacture of the length of polymeric material 12 and in the manufacture of the layer 18. For example, the length of polymeric material 28 may be formed from polyethylene, which may be loaded with about 6% glycol monosterate or about 10% Techmere PM 1530-E4; if so the length of polymeric material 28 comprises an anti-static layer.

The length of polymeric material 28 preferably has a thickness of between about 1 mil and about 6 mils, and more preferably a thickness of about 2.5 mils. The length of polymeric material 28 preferably has small diameter pinholes formed therethrough in a predetermined pattern covering its entire surface area. The pinholes formed through the length of polymeric material 28 preferably has a spacing of 2 centimeters or less therebetween. The pinholes of the length of polymeric material 28 may be formed as described above in conjunction with the length of polymeric material 12.

The pinch rollers 26 function to squeeze the length of polymeric film 12, the layer 18, the layer of conductive, low capacitance fiber 24, and the length of polymeric material 28 together, whereupon the layer 18 bonds the length of polymeric material 12 to the length of polymeric material 28 with the layer of conductive, low capacitance fiber 24 sandwiched therebetween. The result of this procedure is an anti-static film 32 comprising two layers of polyethylene film, each having a thickness of approximately 1.5 mils and each having pinholes formed there through in accordance with a predetermined pattern, the spacing of the pin holes preferably being two centimeters or less, and a layer of conductive, low capacitance fibers sandwiched between the two polymeric film layers, the entire assembly being permanently secured together by the layer 18.

The result of the foregoing procedure is further illustrated in FIG. 2. In those instances in which the film layers of the anti-static film 32 are transparent or nearly so, the layer of conductive, low capacitance fibers 24 can be observed therethrough. Although the layer 24 is illustrated in FIG. 24 as comprising a diamond-shaped pattern, in actual practice a pattern comprising parallel, straight lines is preferred. The conductive, low capacitance fiber layer 24 is preferably about 10 denier. The spacing between adjacent fibers comprising the layer is preferably between about 1 centimeter and about 3 centimeters, and more preferably about 2 centimeters.

In accordance with one application of the invention, the width of the anti-static film 32 fabricated in accordance with the method and apparatus of FIG. 1 may be between about 30 inches and about 50 inches. Upon completion, the anti-static film 32 is cut into a plurality of pieces in accordance with a predetermined pattern. The cut pieces of anti-static film 32 are then assembled to form a bulk bag liner having desired dimensions.

Referring to FIG. 3, there is shown a bulk bag liner 34 comprising any of the anti-static films of the present invention. The bulk bag liner 34 comprises four side walls 36, a top wall 38, a corresponding bottom wall (not shown), a fill chute or spout 40, and a discharge chute or spout 42. Those skilled in the art will further appreciate the fact that the top wall 38, the fill chute 40, and/or the discharge chute 42 are optional and may not be required in accordance with particular applications of the invention. Those skilled in the art will understand that the antistatic films of the present invention may also be used to make tubular liners and tapered tubular liners.

When used, the component parts of the bulk bag liner 34 are preferably joined together along their respective edges by heat seals 44. The bulk bag liner 34 is preferably fabricated using conventional heat sealing techniques. Other conventional techniques for joining panels comprising polymeric films one to the other may be utilized in the practice of the invention, if desired.

Figure 4:
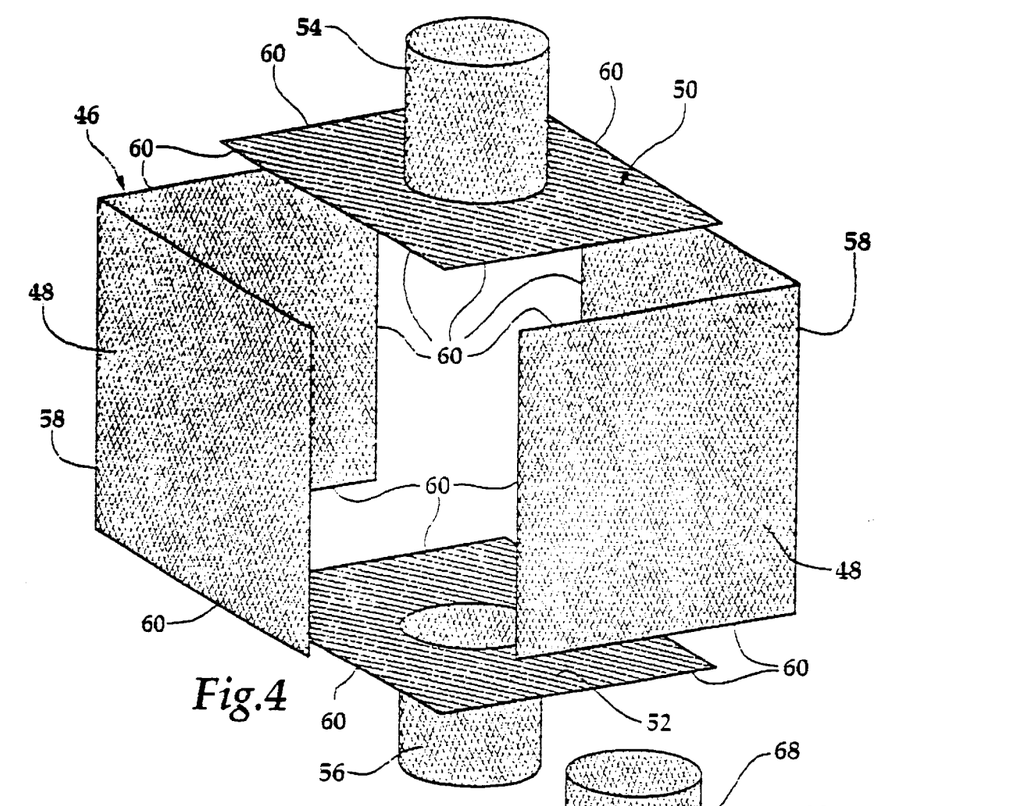
FIG. 4 is an exploded view illustrating an alternative configuration of the anti-static bulk bag liner of FIG. 3.

Referring now to FIG. 4, the method and apparatus of FIG. 1 may be utilized to fabricate the anti-static film 32 in a width of 80 inches or more. This facilitates the construction of a bulk bag 46 from an anti-static film of the present invention having a construction which is somewhat different from that of FIG. 3. Specifically, the bulk bag 46 includes sidewalls 48, a top wall 50, a bottom wall 52, a fill chute or spout 54, and a discharge chute or spout 56. Those skilled in the art will appreciate the fact that the use of the top wall 50, the fill chute 54, and/or the discharge chute 56 is optional, and that these components may not be required in certain applications of the invention.

Because of the increased width of the anti-static film utilized in the fabrication of the bulk bag 46, the sidewalls 48 thereof are provided with folds 58 located at or near the center of the width thereof. The bulk bag 46 is constructed by heat sealing the various panels comprising the bulk bag one to another along the respective peripheral edges 60 thereof. Conventional heat sealing techniques are preferably utilized in the construction of the bulk bag 46. Other well-known techniques adapted for the joinder of polymeric panels one to another may also be utilized in the practice of the invention.

Figure 5:
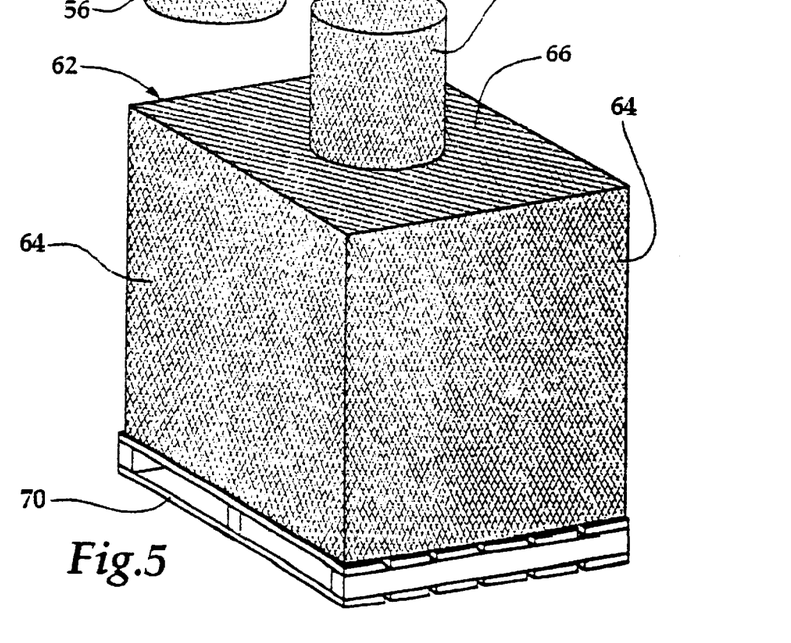
FIG. 5 is a view similar to FIG. 3 illustrating a bulk bag comprising anti-static film manufactured in accordance with the present invention.

FIG. 5 illustrates a bulk bag 62 constructed from one of the anti-static films manufactured in accordance with the method and apparatus of FIG. 1, it being understood that when anti-static film is used to manufacture bulk bags as opposed to liners, the polymeric layers thereof may be somewhat thicker. The bulk bag 62 comprises four sidewalls 64, or the bulk bag 62 may comprise two sidewalls 64 similar to the sidewalls 48 of the bulk bag 46 of FIG. 4. The bulk bag 62 further includes a top wall 66, a bottom wall (not shown), and a fill chute or spout 68. All of the panels comprising the bulk bag 62 comprise an anti-static film and may be joined together along their peripheral edges using conventional heat sealing techniques. Other conventional methods of joining polymeric panels one to the other may be utilized in the practice of the invention, if desired.

The bulk bag 62 further includes a pallet 70, which is positioned under and which supports the bottom wall of the bulk bag 62. The pallet 70 is preferably formed from wood.

In the use of the bulk bag 62, the fill chute 68 is utilized to facilitate the receipt of materials to be received, stored, and transported within the bulk bag. The pallet 70 is utilized to manipulate the bulk bag 62 from point to point. The bulk bag 62 is adapted for discharge by means of a vacuum wand inserted therein through the fill chute 68. The bulk bag 62 is particularly adapted for use with materials having MIE's greater than 0.25 mJ.

Figures 8, 9:
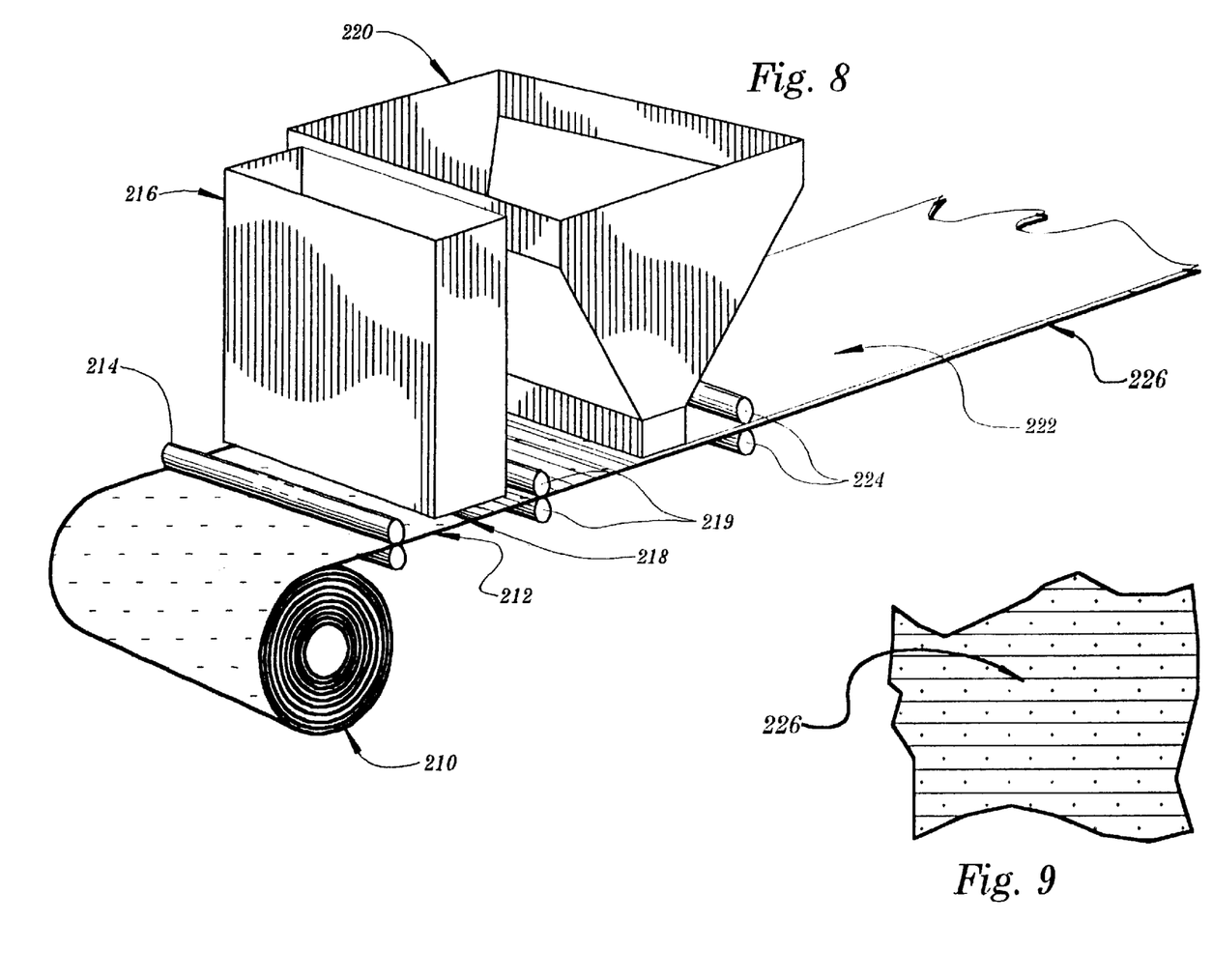
FIG. 8 is a diagrammatic illustration of a first alternative of the first embodiment of the invention.
FIG. 9 is an illustration of an anti-static film constructed according to the method of FIG. 8.

Referring now to FIG. 8, there is illustrated a method of and apparatus for fabricating anti-static film comprising a first alternative of the first embodiment of the invention. A supply roll 210 supplies a length of polymeric film 212 which is directed along a predetermined path. A pair of pinch rollers 214 are employed to pull the length of polymeric film 212 from the supply roll 210. A variety of polymeric films may be utilized in the practice of the invention, however, the use of polyethylene film having a thickness of about 1.5 mils is preferred. The film 212 may be loaded with about 6% glycol monosterate or about 10% Techmer PM 1530-E4 and if so comprises an anti-static layer.

The length of polymeric film 212 is preferably perforated over its entire surface area. The perforations comprise very small diameter pinholes which extend entirely through the film 212. The pinholes formed in the film 212 are preferably separated one from another by a distance of 2 centimeters or less.

After passing through the pinch rollers 214, the polymeric film 212 passes through a mechanism 216 which forms a layer of conductive, low capacitance fibers 218 on top of the film 212. The mechanism 216 is preferably of the type known in the art as Max Katz Bag Co. Diamond Pattern Scrim Laying Equipment. Such mechanisms receive fibers in roll form and function to apply the fibers from the roll onto a surface in accordance with a predetermined pattern.

The conductive, low capacitance fibers comprising the layer 218 preferably comprise "RESITAT"® fibers available from B.A.S.F. Alternatively, the conductive, low capacitance fibers comprising the layer 218 may comprise "NEGA-STAT"® fibers available from DuPont. Other conductive, low capacitance fibers, now known or hereafter developed, may be utilized in the practice of the invention, if desired.

FIG. 8 illustrates a pair of pinch rollers 219 which receive the length of polymeric film 212 following the application of the layer of conductive, low capacitance fibers 218 thereto. If employed, the pinch rollers 219 apply tension to the length of polymeric film 212. As will be understood by those skilled in the art, the use of the pinch rollers 219 may not be required in all applications of the invention.

The length of polymeric film 212 having the layer of fibers 218 thereon next passes through an extrusion coating mechanism 220. The extrusion mechanism 220 forms a layer 222 on the surface of the length of polymeric film 212 and extending on top of the layer of fibers 218. Various substances may be used in the practice of the invention to form the layer 222. However, the layer 222 preferably comprises a polymeric adhesive formed from the same polymer as is used in forming the polymeric film 212. Those skilled in the art will understand that although the film 212 and the layer 222 comprise the same base polymer, the two materials may differ slightly in that they may contain somewhat different additives. Like the film 212, the layer 222 may be loaded with about 6% glycol monosterate or about 10% Techmer PM 1530-E4, whereby the layer 222 comprises an anti-static material.

A pair of pinch rollers 224 may be utilized to regulate the thickness of the layer 222. Preferably, the thickness of the layer 222 is about 0.5 mil. The pinch rollers 224 function to squeeze the length of polymeric film 212, the layer of conductive, low capacitance fiber 218, and the layer 222 together, whereupon the layer 222 bonds the layer of fibers 218 to the length of polymeric material 212 and fills the pinholes therein. The result of this procedure is an anti-static film 226 comprising a layer of polyethylene film, having a thickness of approximately 1.5 mils and having pinholes formed there through in accordance with a predetermined pattern, the spacing of the pin holes being two centimeters or less, and a layer of conductive, low capacitance fibers permanently secured to the polyethylene film layer by the layer 222. The resulting construction is illustrated in FIG. 9.

Figures 10, 11:
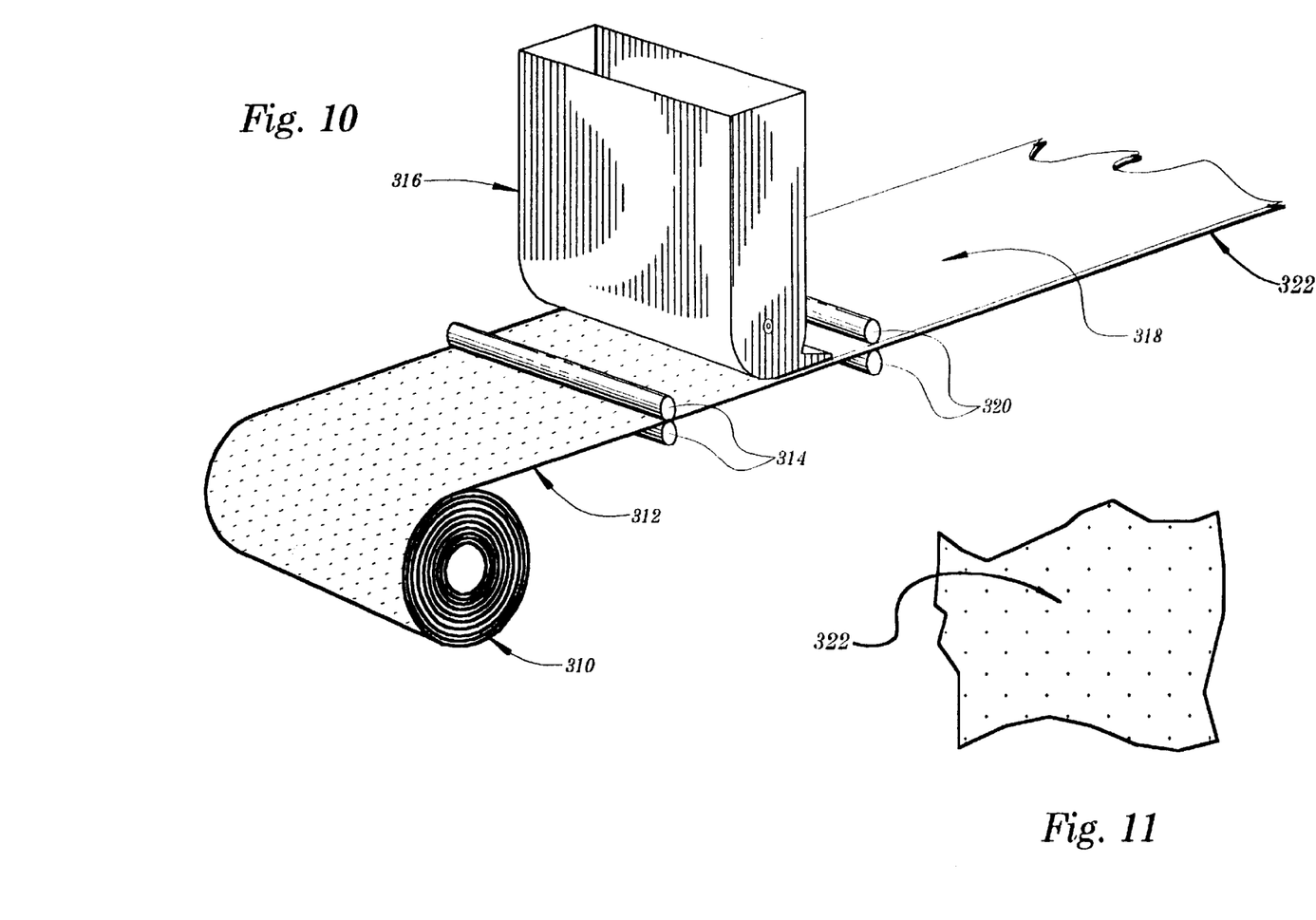
FIG. 10 is a diagrammatic illustration of a second alternative of the first embodiment of the invention.
FIG. 11 is an illustration of an anti-static film manufactured in accordance with the process of FIG. 9.

Referring to FIGS. 10 and 11, there is illustrated a method of an apparatus for fabricating anti-static film comprising a second alternative of the first embodiment of the invention. A supply roll 310 supplies a length of polymeric film 312 which is directed along a predetermined path. A pair of pinch holders 314 are employed to pull the length of polymeric material 312 from the supply roll 310. A variety of polymeric films may be utilized in the practice of the invention, however, the use of polyethylene films having a thickness of 1.5 mils is preferred. The film 312 may be loaded with about 6% glycol monosterate or about 10% Techmer PM 1530-E4 and if so comprises an anti-static layer.

The length of polymeric film 312 is preferably perforated over its entire surface area. Perforations comprise the small diameter pin holes which extend entirely through the film 312. The pin holes formed in the film 312 are preferably separated from one another by a distance of two centimeters or less.

After passing through the pinch holders 314, the length of polymeric film 312 passes through an extrusion coating mechanism 316. The extrusion coating mechanism 316 forms a layer 318 on the surface of the length of polymeric film. Various substances may be used in the practice of the invention to form the layer 318. However, the layer 318 preferably comprises a polymeric adhesive formed from the same polymer as used in forming the polymeric film 312. Those skilled in the art will understand that although the film 312 and the layer 318 comprise the same base polymer, the materials may differ slightly in that they may contain somewhat different additives. Like the film 312, the layer 318 may be loaded with about 6% glycol monosterate or about 10% Techmere PM 1530-E4, whereby the layer 318 comprises an anti-static material.

A pair of pinch holders 320 may be utilized to regulate the thickness of the layer 318. Preferably the thickness of the layer 318 is about 1 mil. The pinch holders 320 function to squeeze the polymeric film 312 and the layer 318 together into a permanent construction. The pinch holders 320 also force the material of the layer 318 into the pin holes of the film 312, thereby filling the pin holes.

Referring to FIG. 10, the result of the foregoing procedure is an anti-static film 322 comprising a length of polymeric film having a thickness of approximately 1.5 mils and having pin holes formed therethrough in accordance with a predetermined pattern, the spacing of the pin holes being two centimeters or less, and a layer 318 permanently secured to one side of the film 312. The layer 318 has a thickness of about 1 mil and functions to fill the pin holes of the film. The resulting construction is illustrated in FIG. 11.

Figures 6, 7:
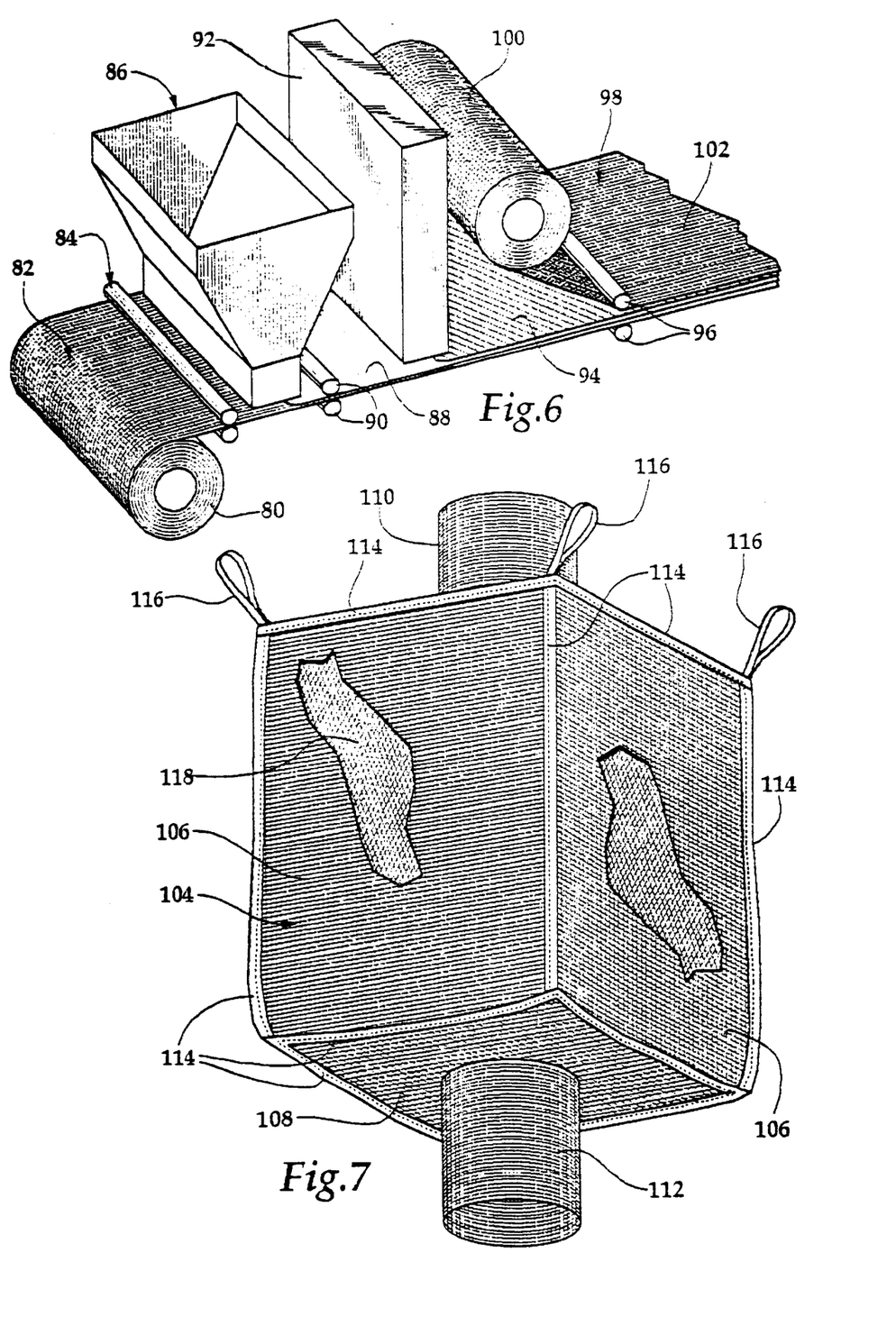
FIG. 6 is a diagrammatic illustration of a method of and apparatus for manufacturing anti-static fabric comprising a second embodiment of the present invention.
FIG. 7 is an illustration of an anti-static bulk bag comprising anti-static fabric manufactured in accordance with the present invention.

FIG. 6 illustrates a method of and apparatus for fabricating anti-static fabric comprising a second embodiment of the invention. A supply roll 80 feeds a length of woven polymeric fabric 82. A pair of pinch is rollers 84 are utilized to direct the length of woven polymeric fabric 82 along a predetermined path. Preferably, the length of polymeric fabric 82 comprises 3-ounce woven polypropylene of the type commonly employed in the bulk bag industry. Other types and kinds of woven polymeric materials may be utilized in the practice of the invention, if desired. The fabric 82 may be coated with a material loaded with about 6% glycol monosterate or about 10% Techmere PM 1530-E4 in which case the fabric 82 comprises an anti-static layer.

From the pinch rollers 84, the length of woven polymeric material 82 passes into an extrusion coating mechanism 86. The extrusion coating mechanism 86 forms a layer 88 on the length of woven polymeric fabric 82. A pair of pinch rollers 90 may be utilized to control the thickness of the layer 88.

Various materials may be utilized in the practice of the invention to form the layer 88. Preferably, the layer 88 comprises a polymeric adhesive formed from the same material that is utilized in the fabrication of the length of polymeric material 82. For example, if the length of woven polymeric material 82 comprises woven polypropylene, the layer 88 preferably comprises a polypropylene adhesive. Those skilled in the art will appreciate the fact that although the length of woven polymeric material 82 and layer 88 comprise the same base polymer, the materials may differ slightly in that they may contain different additives. The polymeric material comprising the layer 88 may be loaded with about 6% glycol monosterate or about 10% Techmere PM 1530-E4, and if so comprises an anti-static material.

The length of woven polymeric material 82 and the layer 88 are next directed into a mechanism 92 which forms a layer of conductive, low capacitance fibers 94 on the adhesive layer 88. The mechanism 92 is preferably of the type known in the industry as Max Katz Bag Co. Diamond Pattern Scrim Laying Equipment. Such mechanisms receive the fibers comprising the layer 94 in roll form and function to apply the fibers to the surface of the adhesive layer 88 in accordance with a predetermined pattern.

The length of woven polymeric fabric 82 and the layer 88 having the layer of conductive, low capacitance fibers 94 thereon are next directed between a pair of pinch rollers 96. A second length of woven polymeric material 98 is fed from a supply roll 100 and also passes between the pinch rollers 96. The length of woven polymeric material 98 preferably comprises the same material as is used in the fabrication of the first length of woven polymeric material 82. For example, if the first length of woven material 82 comprises 3-ounce woven polypropylene, then the second length of woven polymeric material 98 also comprises 3-ounce woven polypropylene. Those skilled in the art will appreciate the fact that the method of and apparatus for fabricating anti-static fabric of FIG. 6 may be utilized with two different types of woven polymeric material and/or two different weights of woven polymeric material, if desired. The material from which the fabric 82 is manufactured may include, or the fabric 82 may be coated with a material comprising about 6% glycol monosterate or about 10% Techmer PM 1530-E4, in which case the fabric comprises an anti-static layer.

The pinch rollers 96 function to squeeze the length of polymeric material 82 and the length of polymeric material 98 towards one another, whereby the two lengths of woven polymeric materials are permanently bonded one to the other with the layer of conductive, low capacitance fibers 94 sandwiched therebetween. This results in an anti-static fabric 102 comprising two layers of woven polymeric material having a layer of conductive, low capacitance fibers sandwiched-therebetween and permanently bonded by the layer 88.

Upon completion, the anti-static fabric 102 is cut into pieces in accordance with a predetermined pattern. The pieces of anti-static fabric thus formed are then joined together to form a bulk bag having desired dimensions. Preferably, the pieces of anti-static fabric fabricated in accordance with the method and apparatus of FIG. 6 are joined together by sewing. Other fabrication techniques commonly employed in the bulk bag industry in the fabrication of bulk bags may also be utilized in the practice of the invention.

Referring to FIG. 7, there is shown a bulk bag 104 fabricated from anti-static fabric 102, manufactured in accordance with the method and apparatus of FIG. 6. The bulk bag 104 comprises 4 side panels 106, a top wall (not shown), a bottom wall 108, which is identical in construction and dimension to the top wall, a fill chute or spout 110, and a discharge chute or spout 112. Those skilled in the art will appreciate the fact that the top wall, the fill chute 110, and/or the discharge chute 112 comprise optional components and may be dispensed within the practice of certain applications of the invention.

The component parts of the bulk bag 104 are joined together along their respective peripheral edges, preferably by sewing, which results in seams 114. The bulk bag 104 may be provided with conventional lift loops 116 or lift sleeves (not shown), which may be secured in place during the joinder of the various panels comprising the bulk bag one to the other. Those skilled in the art will appreciate the fact that although the bulk bag construction technique illustrated in FIG. 7 is commonly employed in the bulk bag industry, other bulk bag construction techniques, particularly including the U-panel bulk bag construction technique and the tubular bulk bag construction technique may also be employed in the practice of the invention, if desired.

The anti-static bulk-bag 104 may be provided with an anti-static liner 118. The anti-static liner 118 may be of the type illustrated in FIG. 3 and described hereinabove in conjunction therewith. Alternatively, the anti-static liner 118 may be of the type illustrated in FIG. 4 and described hereinabove in conjunction therewith. Other types and kinds of anti-static liners, particularly liners constructed from the materials of FIGS. 8 and 10 hereof, may be utilized in conjunction with the anti-static bulk bag 104, if desired.

Figure 12:
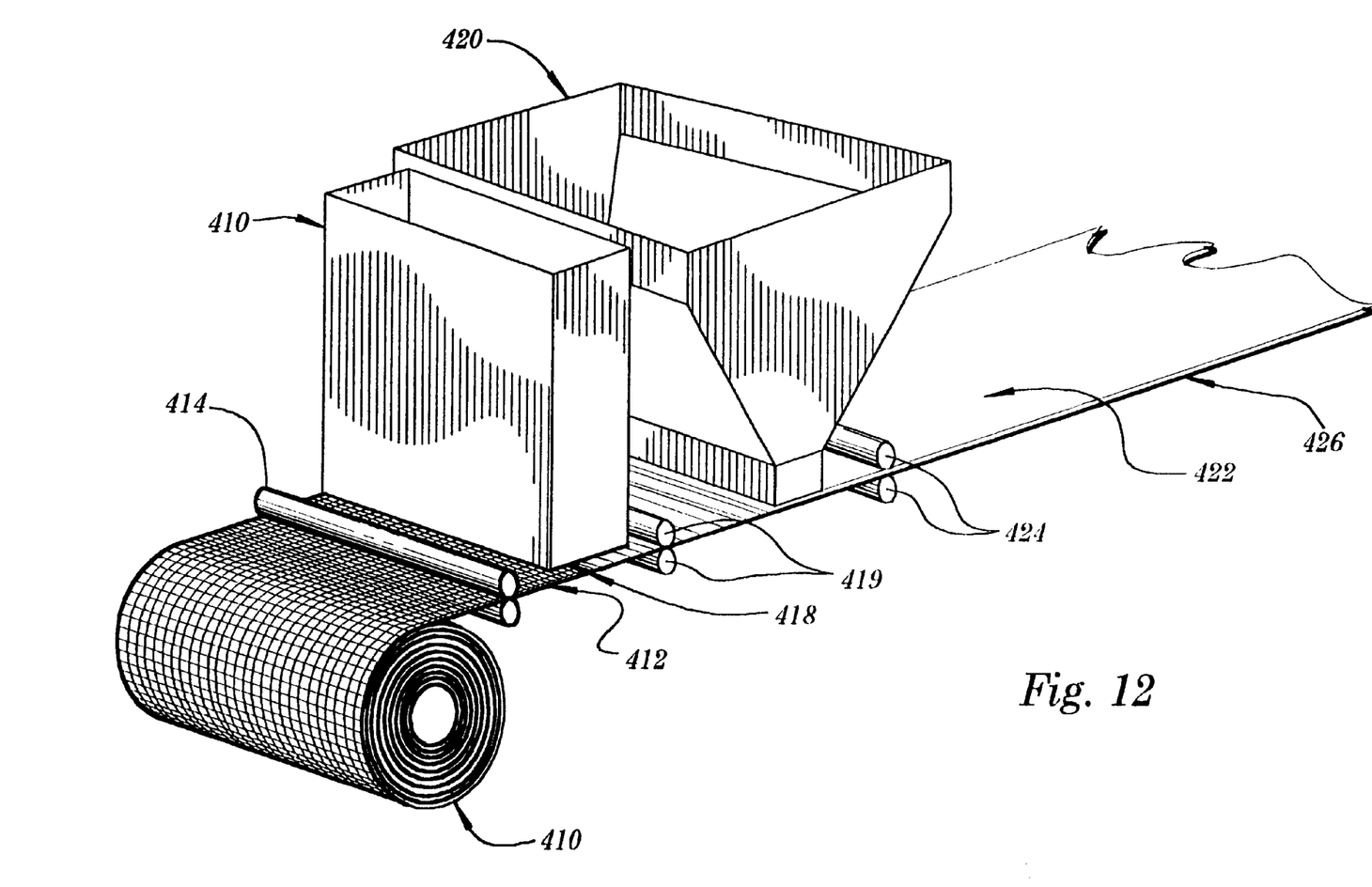
FIG. 12 is a diagrammatic illustration of a first alternative of the second embodiment of the invention.

Referring now to FIG. 12, there is illustrated a method of and apparatus for fabricating anti-static fabric comprising a first alternative of the second embodiment of the invention. A supply roll 410 supplies a length of polymeric fabric 412 which is directed along a predetermined path. A pair of pinch rollers 414 are employed to pull the length of polymeric fabric 412 from the supply roll 410. A variety of polymeric fabrics may be utilized in the practice of the invention, however, the use of 3 ounce woven polypropylene fabric is preferred. The fabric 412 may be coated with about 6% glycol monosterate or about 10% Techmer PM 1530-E4 and if so comprises an anti-static layer.

After passing through the pinch rollers 414, the polymeric fabric 412 passes through a mechanism 416 which forms a layer of conductive, low capacitance fibers 418 on top of the fabric 412. The mechanism 416 is preferably of the type known in the art as Max Katz Bag Co. Diamond Pattern Scrim Laying Equipment. Such mechanisms receive fibers in roll form and function to apply the fibers from the roll onto a surface in accordance with a predetermined pattern.

The conductive, low capacitance fibers comprising the layer 418 preferably comprise "RESITAT"® fibers available from B.A.S.F. Alternatively, the conductive, low capacitance fibers comprising the layer 418 may comprise "NEGA-STAT"® fibers available from DuPont. Other conductive, low capacitance fibers, now known or hereafter developed, may be utilized in the practice of the invention, if desired.

FIG. 12 illustrates a pair of pinch rollers 419 which receive the length of polymeric fabric 412 following the application of the layer of conductive, non-capacitive fibers 418 thereto. If employed, the pinch rollers 419 apply tension to the length of polymeric fabric 412. As will be understood by those skilled in the art, the use of the pinch rollers 419 may not be required in all applications of the invention.

The length of polymeric fabric 412 having the layer of fibers 418 thereon next passes through a extrusion coating mechanism 420. The extension mechanism 420 forms a layer 422 on the surface of the length of polymeric fabric 412 and extending on top of the layer of fibers 418. Various substances may be used in the practice of the invention to form the layer 422. However, the layer 422 preferably comprises a polymeric adhesive formed from the same polymer as is used in forming the polymeric fabric 412. Those skilled in the art will understand that although the fabric 412 and the layer 422 comprise the same base polymer, the two materials may differ slightly in that they may contain somewhat different additives. Like the fabric 412, the layer 422 may be loaded with about 6% glycol monosterate or about 10% Techmere PM 1530-E4, whereby the layer 422 comprises an anti-static material.

A pair of pinch rollers 424 may be utilized to regulate the thickness of the layer 422. Preferably, the thickness of the layer 422 is about 0.5 mil. The pinch rollers 424 function to squeeze the length of polymeric fabric 412, the layer of conductive, low capacitance fiber 418, and the layer 422 together, whereupon the layer 422 bonds the layer of fibers 418 to the length of polymeric fabric 412. The result of this procedure is an anti-static fabric 426 comprising a layer of polyethylene film, having a thickness of approximately 1.5 mils and having pinholes formed there through in accordance with a predetermined pattern he spacing of the pin holes being two centimeters or less, and a layer of conductive, low capacitance fibers permanently secured to the polyethylene film layer by the adhesive layer 422. The resulting construction is illustrated in FIG. 9.

Figure 13:
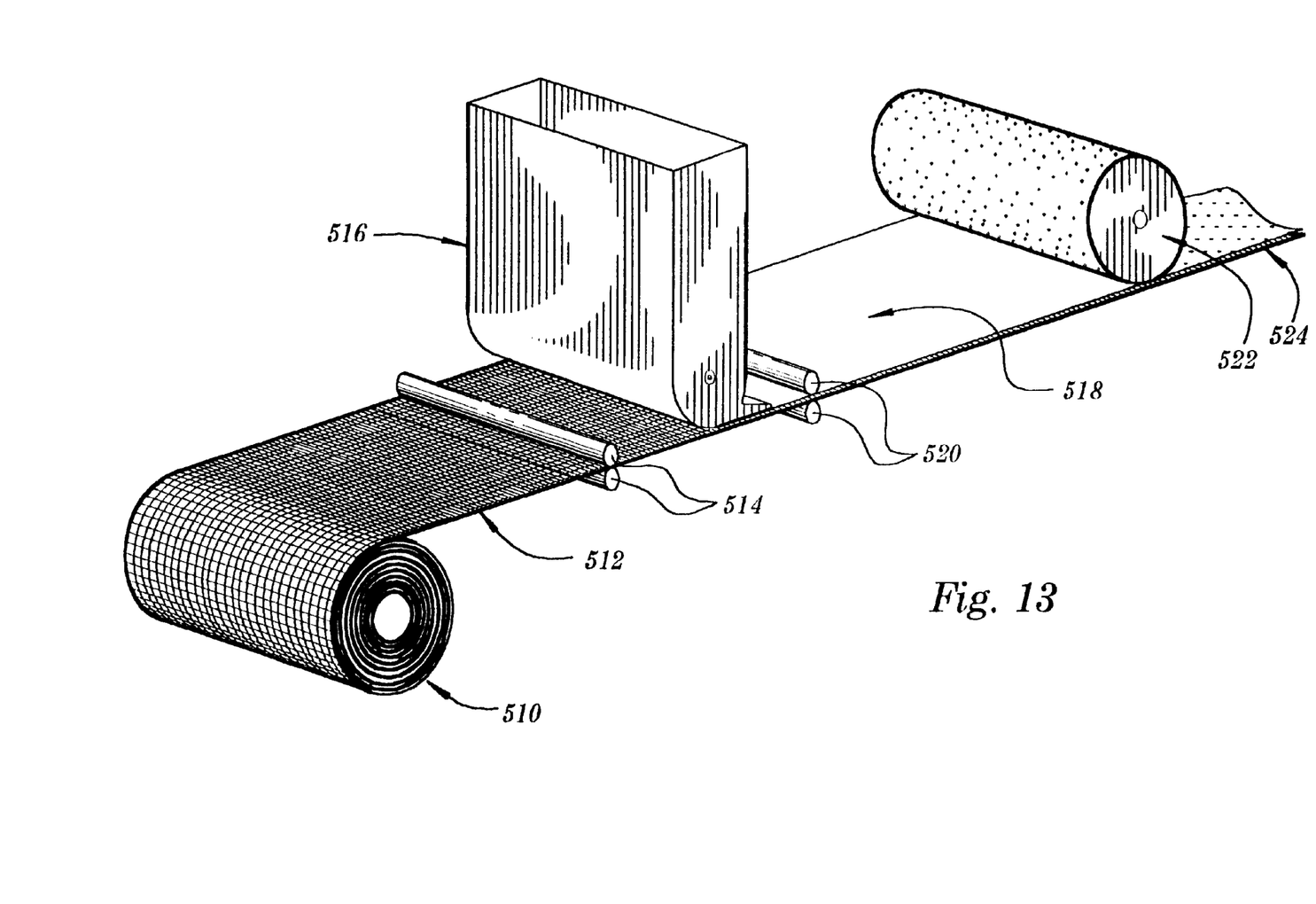
FIG. 13 is a diagrammatic illustration of a second alternative of the second embodiment of the invention.

Referring to FIG. 13, there is illustrated a method of an apparatus for fabricating anti-static fabric comprising a second alternative of the second embodiment of the invention. A supply roll 510 supplies a length of polymeric fabric 512 which is directed along a predetermined path. A pair of pinch rollers 514 are employed to pull the length of polymeric fabric 512 from the supply roll 510. A variety of polymeric fabrics may be utilized in the practice of the invention, however, the use of 3 ounce woven polypropylene fabric is preferred. The fabric 512 may be coated with about 6% glycol monosterate or about 10% Techmer PM 1530-E4 and if so comprises an anti-static layer.

After passing through the pinch rollers 514, the length of polymeric fabric 512 passes through an extrusion coating mechanism 516. The extrusion coating mechanism 516 forms a layer 518 on the surface of the length of polymeric film. Various substances may be used in the practice of the invention to form the layer 518. However, the layer 518 preferably comprises a polymeric adhesive formed from the same polymer as used in forming the polymeric fabric 512. Those skilled in the art will understand that although the fabric 512 and the layer 518 comprise the same base polymer, the materials may differ slightly in that they may contain somewhat different additives. Like the fabric 512, the layer 518 may be loaded with about 6% glycol monosterate or about 10% Techmere PM 1530-E4, whereby the layer 518 comprises an anti-static material.

A pair of pinch rollers 520 may be utilized to regulate the thickness of the layer 518. Preferably the thickness of the adhesive layer 518 is about 1 mil. The pinch rollers 520 function to squeeze the polymeric fabric 512 and the layer 518 together into a permanent construction.

A roller 522 may be employed to form pinholes in the layer 518. If used, the roller 522 has a plurality of pins each having a diameter of about 0.080 inches extending therefrom. The pins form pinholes in the layer 518 having diameters of between about 50 and about 150 micrometers.

The result of the foregoing procedure is an anti-static film 524 comprising a length of polymeric fabric having a layer 518 permanently secured to one side thereof. The layer 518 has a thickness of about 1 mil and has the pinholes formed therein.

Although preferred embodiments of the invention have been illustrated in the accompanying drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. An anti-static fabric for use in fabricating bulk bags comprising:

a layer of polymeric fabric;

a layer of conductive, low capacitance fibers; and a layer for permanently bonding the layer of polymeric fabric to the layer of conductive, low capacitance fibers;

the bonding layer having pin holes formed therethrough in a predetermined pattern.

2. The anti-static fabric according to claim 1 wherein the polymeric fabric layer and the bonding layer are formed from the same polymeric material.

\* \* \* \* \*